INVENTOR
DALE M. JAHN
BY
R. V. Craddock
ATTORNEY

INVENTOR
DALE M. JAHN
BY R. V. Craddock
ATTORNEY

Jan. 3, 1956 D. M. JAHN 2,729,812

APPARATUS FOR CONVERTING DIGITAL INFORMATION TO AN ANALOG VOLTAGE

Filed Oct. 4, 1954 3 Sheets-Sheet 3

INVENTOR

DALE M. JAHN

BY

ATTORNEY

United States Patent Office 2,729,812
Patented Jan. 3, 1956

2,729,812

APPARATUS FOR CONVERTING DIGITAL INFORMATION TO AN ANALOG VOLTAGE

Dale M. Jahn, Garden City, N. Y., assignor to Sperry Rand Corporation, a corporation of Delaware Application October 4, 1954, Serial No. 459,973

9 Claims. (Cl. 340—347)

This invention relates to analog digital decoding apparatus, and more particularly, is concerned with an electronic circuit for converting a binary number to an analog voltage.

Various means have heretofore been proposed in the prior art for converting digital information to analog information. Such known means include electro-mechanical apparatus involving relays and/or a rotational shaft output. While such known systems may be quite accurate at lower pulse frequencies, they are not satisfactory for use in systems using a high pulse repetition rate. Electronic decoding circuits have heretofore been proposed which are capable of operating at high pulse frequencies; however, such known circuits have required precise timing of the duration and period of the number pulses, as well as precise control of the amplitude of these pulses, in order to achieve a high degree of accuracy.

It is the general object of this invention to avoid the foregoing and other difficulties of the prior art practices by the provision of a digital to analog converter which is characterized by its high speed of operation and accuracy, and yet is relatively uncomplicated, highly stable in performance, as well as rugged and foolproof in operation.

Another object of this invention is the provision of a decoder capable of decoding binary numbers having as many as ten digits per number.

Another object of this invention is to provide an all electronic decoding device for decoding both positive and negative binary numbers.

These and other objects of the invention which will become apparent as the description proceeds are achieved by the provision of apparatus comprising a pair of condensers with an electronic switching circuit for connecting the condensers in parallel. A second electronic switch is provided for connecting one of the condensers across a potential source and a third electronic switch is provided for connecting a short-circuit across the one condenser. Decoding is achieved by momentarily closing the second switch in response to binary digits 1 and momentarily closing the third electronic switch in response to binary digit 0. The first switch momentarily connects the condensers in parallel after the second or third switches have been actuated. The analog voltage is derived across one of the condensers. Suitable electronic means are provided for driving the switches in response to timing pulses and number pulses derived from the digital number information source.

Figures 1, 2, 3:
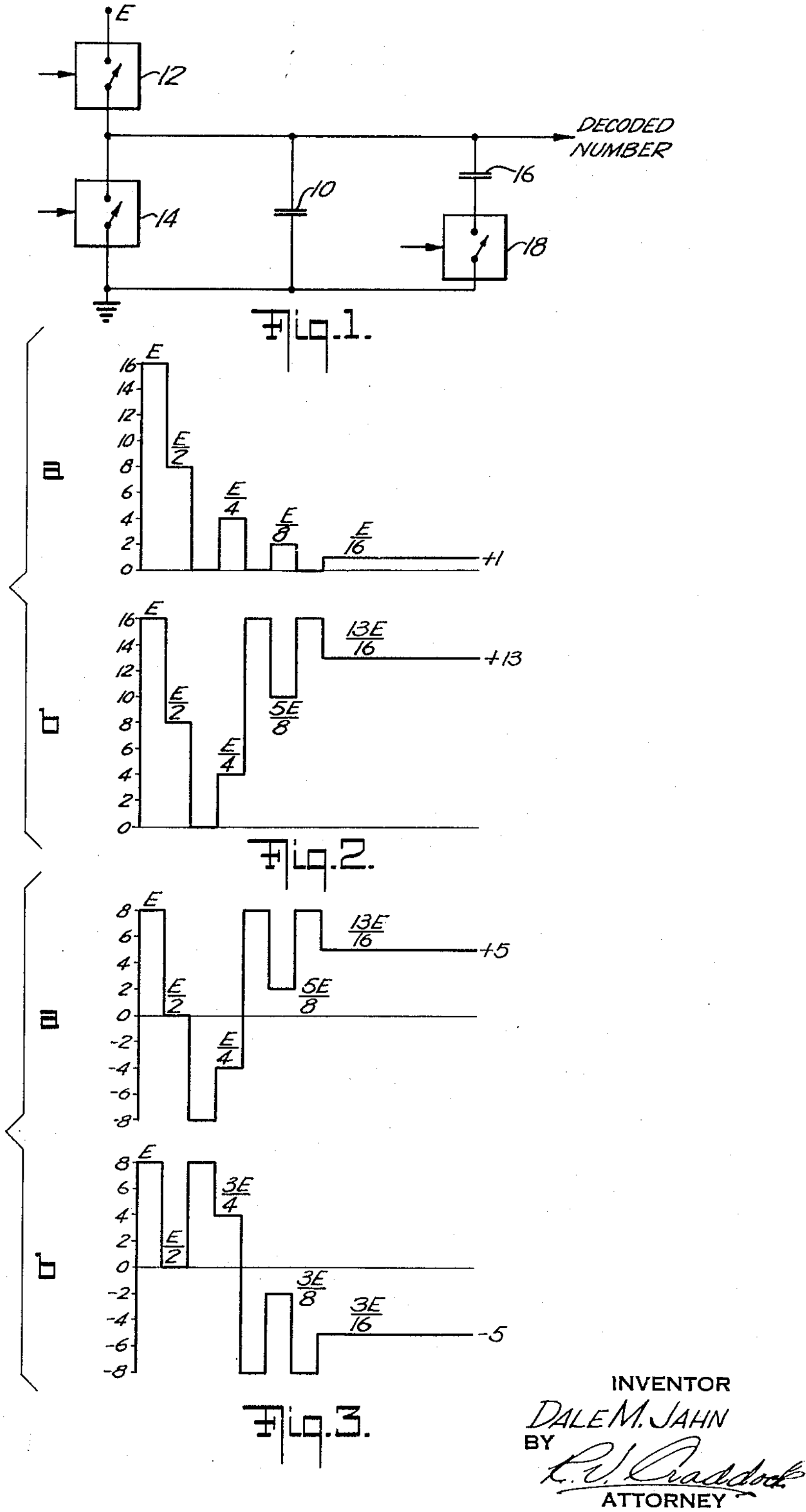
Figure 4:
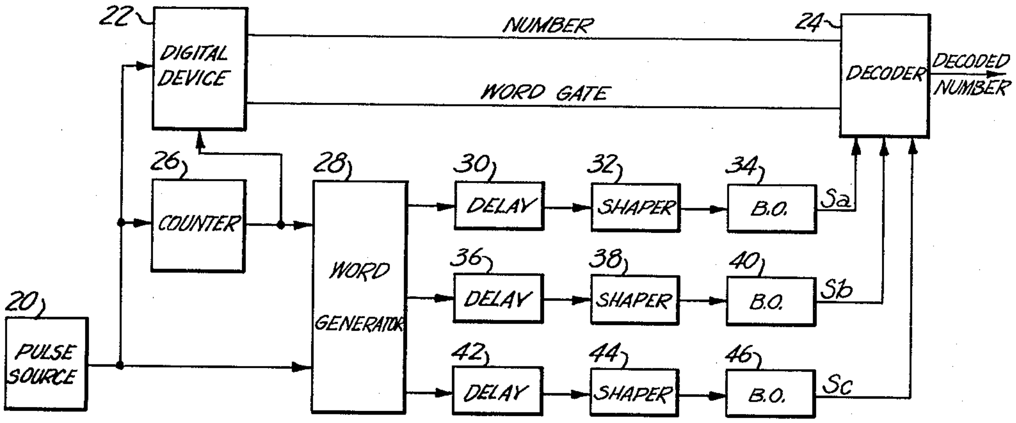
Figure 5:
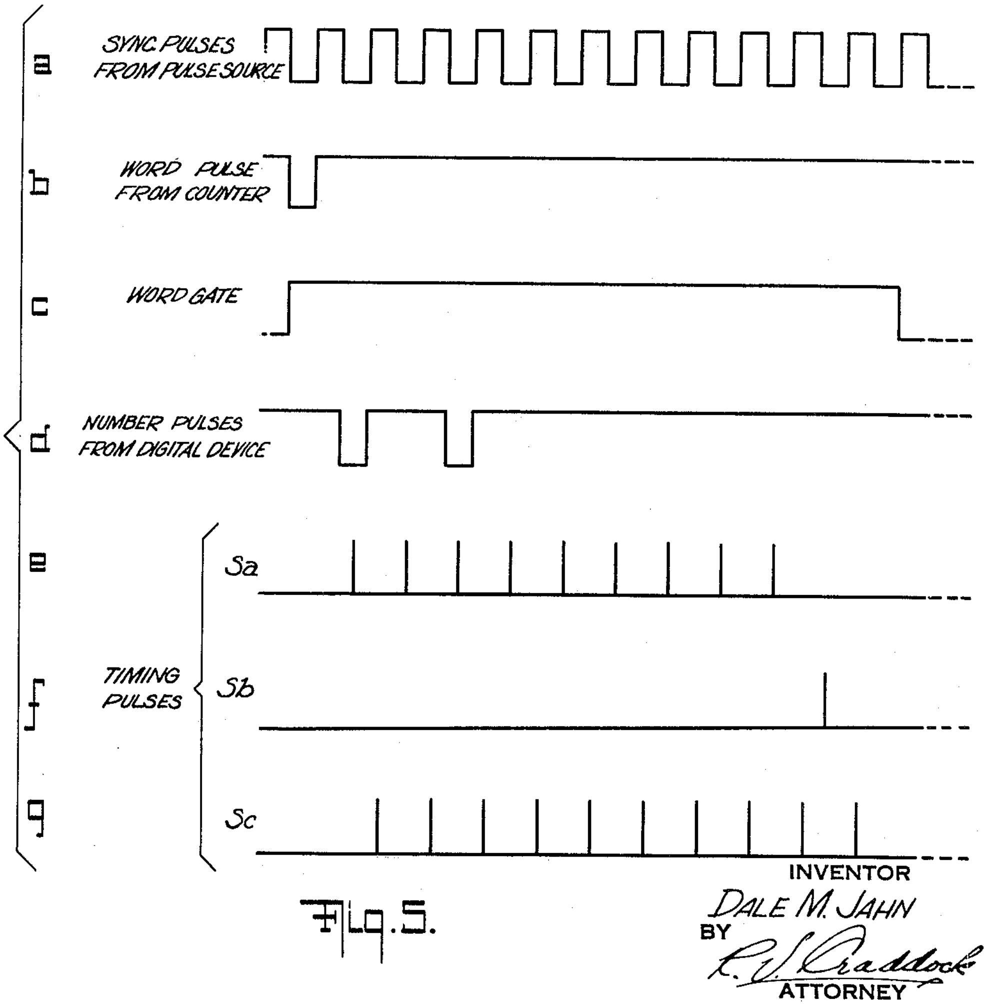
Figure 6:
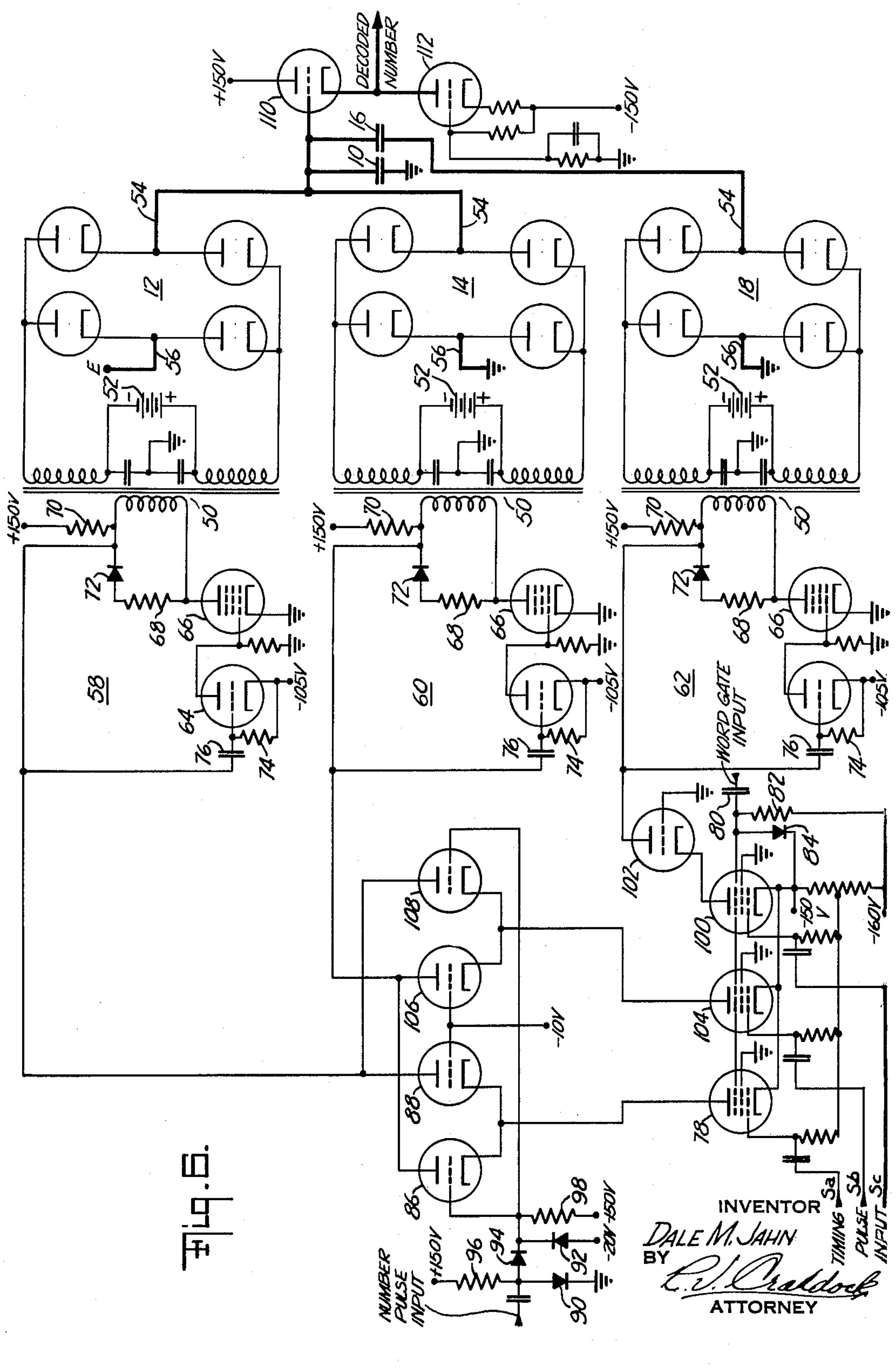

For a better understanding of the invention reference should be made to the accompanying drawings, wherein:

Fig. 1 is a schematic diagram of the basic decoding circuit;

Figs. 2*a* and *b* and Figs. 3*a* and *b* are a series of diagrams used in explaining the mode of operation of the circuit of Fig. 1;

Fig. 4 is a block diagram showing the manner in which the decoder is operated in a complete digital system;

Figs. 5*a–g* are a series of input pulse configurations applied to the decoder; and Fig. 6 is a complete schematic diagram of a preferred embodiment of the decoder of the present invention.

It is known that any number can be represented by an infinite series expressed as $$N= \ldots k2^2+k2^1+k2^0+k2^{-1}+k2^{-2}+ \ldots$$

where the coefficient $k$ is one or the other of the binary digits zero and one. If a number $e$ is chosen, for example, as a fraction of some number E, any expression for $e$, assuming $n$ significant digits, is $$e=E\left(\frac{k}{2^n}+\frac{k}{2^{n-1}}+\frac{k}{2^{n-2}}+ \cdots +\frac{k}{2}\right)$$

Thus each digit has a weight associated with it such as one-half, one-fourth, one-eighth, etc. Decoding a primary number then can be accomplished by ascertaining the one digits, assigning the proper fractional weight, and assuming up the fractional weights to produce the analog value $e$.

The decoding operation is achieved according to the present invention by the basic circuit of Fig. 1 in which a condenser 10 is connected to a potential source E by switch 12 and connected to ground by switch 14. A second condenser 16 of the same capacity as the condenser 10 is connected across the first condenser 10 by a switch 18. By means hereinafter described the switch 12 is momentarily closed in response to the one digits and the switch 14 is momentarily closed in response to the zero digits of a binary number fed to the decoder in serial form with the least significant digit occurring first. The switch 18 is momentarily closed after either the switch 12 or the switch 14 is actuated, dividing the charge on the condenser 10 in half.

The above described circuit operates to assign the proper weights to the digits of the binary number and to sum the weights associated with the one digits. For example, consider the binary number 0001. As shown in Figs. 2*a*, the first digit, being a one, acts to close the switch 12 charging the condenser 10 to a potential E. The switch 18 then closes connecting the condenser 16 across the condenser 10 to divide the charge, so that the potential across the condenser 10 is now $$\frac{E}{2}$$

The next digit in the binary number is zero, which acts to close the switch 14 connecting the condenser 10 to ground and dissipating all charge on the condenser 10. Switch 18 then closes dividing the charge on the condenser 16, so that the potential across the condenser 10 is now $$\frac{E}{4}$$

The next two digits being zeroes, the charge on the condenser is similarly divided twice so that the final charge across the condenser 10 is $$\frac{E}{16}$$

In Fig. 2*b* is shown a similar plot of the potential on condenser 10 when decoding the binary number 1101. The least significant digit being one, the initial charge on the condenser 10 is E as established by the closing of the switch 12. Closing of switch 18 divides this charge in two to the potential $$\frac{E}{2}$$

The next significant digit being a zero, the switch 14 reduces the charge on condenser 10 to zero and the closing of the switch 18 brings the charge back to a potential of $$\frac{E}{4}$$

The next significant digit being a one, the switch 12 is closed bringing the potential across the condenser 10 back up to E and the closing of the switch 18 averages the charge on the condensers 10 and 16, giving 5/8 E. The final digit one again raises the condenser 10 to a charge of potential E which is averaged by the closing of the switch 18 to give a final potential across the condenser 10 of 13/16 E.

It will be seen that every time a one digit is decoded the accumulated charge is in effect divided by two and an increment of charge $$\frac{E}{2}$$

is added, while every time a zero digit is decoded, the accumulated charge is simply divided by two. Therefore, the circuit assigns the proper fractional weights and sums them according to the above expression to give the analog value for *e* for the binary number decoded. The number of significant digits in the binary number being decoded determines the number of increments into which the value E is divided. The limit to the number of digits that can be decoded depends on the leakage effects in the circuit which produce errors in the ultimate charge on the condensers.

An added feature of the present invention is the decoding of negative numbers as well as positive numbers. Negative binary numbers are generally expressed as the complement of the corresponding positive number, that is, the positive and corresponding negative binary numbers when added together give zero. The most significant digit is used to identify the sign. Thus all positive numbers have the most significant digit as a zero, while all negative numbers have it as a one. For example, +5 is expressed in binary form as 0101, whereas —5 is expressed as 1011. According to the present invention, decoding of positive and negative numbers can be achieved by means of the basic circuit of Fig. 1. The circuit is arranged so that the last digit of the binary number received, which is the most significant digit, actuates the switch 12 if it is a zero and actuates the switch 14 if it is a one. In other words, the action of these switches 12 and 14 is reversed for the last digit received. This has the effect of dividing the accumulated charge in half and adding an increment of $$\frac{E}{2}$$

when the last digit decoded is zero, that is, for all positive numbers. When a negative number is decoded, the last digit being a one, the accumulated charge is simply divided in half.

For example, consider the positive number 0101, the analog of which is +5. As shown in Fig. 3*a*, the least significant digit, one, raises the charge on the condenser 10 to the level E, which is divided to $$\frac{E}{2}$$

by the closing of the switch 18. The next digit being a zero, the charge on the condenser 10 is reduced to zero and brought back to $$\frac{E}{4}$$

by the closing of the switch 18. The next digit being a one, the switch 12 is closed bringing the charge on the condenser 10 back to E, and the closing of the switch 18 brings the accumulated charge to 5/8 E. The last and most significant digit being a zero for the positive number, it is made to actuate the switch 12 again, putting a charge E on the condenser 10. The closing of the switch 18 makes the final charge level on the condenser 10 at 13/16 E. On a scale in which E is assigned the number 8 and $$\frac{E}{2}$$

is assigned the value 0, as shown in the scale to the left in Fig. 3*a*, then the final charge 13/16 E will have the value of +5.

Similarly, the negative number 1010, which according to the above notation is the equivalent of the decimal number —5 produces the charging pattern on the condenser 10 indicated in Fig. 3*b*. It will readily be seen that the final level of the charge on the condenser 10 will correspond to the assigned value of —5.

Referring to Fig. 4, there is shown a block diagram of the system in which the decoder is utilized. A pulse source 20, which may be any conventional pulse generator, such as a blocking oscillator, for example, produces clock pulses, as indicated in Fig. 5*a*. These clock pulses are fed to a digital device, such as a computer, which puts out information in the form of binary numbers which are coupled to the decoder, indicated generally at 24. The clock pulses are also fed to a pulse counter 26 which produces word pulses at intervals corresponding to any desired number of clock pulses, as indicated in Fig. 5*b*. The pulse output from the counter 26 is used in the digital device 22 to time the numerical information feeding the decoder and to generate a word gate which is coupled to the decoder 24 to gate open the decoder and hence select information from the digital device. The word gate output is shown in Fig. 5*c*.

At the same time, the clock pulses from the source 20 and word pulses from counter 26 are coupled to a word generator 28, which is a conventional circuit for generating a plurality of output pulse trains of any desired pulse configuration. A suitable generator is described in the publication "The Transistor," a Bell Telephone Laboratory publication, 1951, page 724. The word generator 28 is arranged to put out three trains of timing pulses, the first of which consists of nine successive pulses corresponding to the first nine clock pulses following the gating of the generator by the counter 26. The second output is a single pulse corresponding to the tenth clock pulse received after the gating of the generator by the counter 26. The third output is a train of ten successive pulses corresponding to the first ten clock pulses received by the generator following the gating by the counter 26. The first output is coupled to a delay circuit 30 which introduces a time delay corresponding to roughly a quarter of the period between successive clock pulses. The output of the delay 30 is shaped and amplified by the shaper circuit 32 and coupled to a blocking oscillator 34 which generates very sharp output pulses that are fed to the decoder 24. These output pulses are designated $S_a$ and are shown in Fig. 5*e*.

Similarly the second output of the generator 28 passes to a delay circuit 36, having the same time delay as the circuit 30, is amplified and shaped by the shaper circuit 38 and coupled to a blocking oscillator 40. The timing pulse output of the blocking oscillator 40, designated $S_b$, is shown in Fig. 5*b*.

The third output from the word generator 28 is coupled to a delay circuit 42, which introduces a time delay of roughly three-fourths the period of the clock pulses from the source 20. These delayed pulses are amplified and shaped by the shaper circuit 44 and coupled to a blocking oscillator 46. The output timing pulses from the blocking oscillator 46, designated $S_c$, are shown in Fig. 5*g*.

Referring to Fig. 6 the circuit diagram of the decoder itself is shown. The basic circuit described above in connection with Fig. 1 is incorporated and includes the condensers 10 and 16 and switches 12, 14, and 18. For high speed operation, electronic switches of the diode bridge type are utilized. Such switches are well known in the art and are more fully described in Patent No. 2,250,284. Two series pairs of diode rectifiers are connected across an input transformer 50, which includes two secondary windings having a potential source 52 connected between them to normally maintain the diodes non-conducting. When an input pulse is applied across the transformer 50 of such polarity as to overcome the potential of the source 52, the diodes are rendered conductive, clamping the output point 54 between the second pair of diodes to the same potential as the input point 36 between the first pair of diodes. The input point 56 in the switch 12 of course is at the potential E while the corresponding point of the switches 14 and 18 is at ground potential, in the same manner as described above in connection with Fig. 1.

To trigger the electronic switches 12, 14 and 18, monostable multivibrators, indicated at 58, 60 and 62 respectively, are provided. While pulse amplifiers, or blocking oscillators might conceivably be used for triggering the diode switches, the multivibrators shown have been found preferable because they provide a substantially constant current pulse on the primary of the input transformer 50. The multivibrators include two vacuum tubes, a triode 64 and a pentode 66. The primary of the transformer 50 is connected in series with the plate load resistor 70 of the pentode. A resistor 68 and rectifier 72 provide critical damping across the transformer to damp any oscillation set up in the transformer circuit due to the pulsing at relatively high frequencies. The respective plate and control grid circuits are interconnected in the conventional manner of a multivibrator. An R-C circuit, including a resistor 74 and condenser 76 in the grid circuit of the triode 64, determines the pulse duration time of the monostable multivibrator, that is, the time in which it is restored to its stable state after a triggering pulse is applied thereto.

To trigger the switches 12 and 14 in response to the pulses or no-pulses of the binary number being decoded, according to the concepts of the invention as above described, timing pulses designated $S_a$ as derived from the word generator 28 are brought in through a gate circuit including a pentode 78. The word gate input derived from the digital device 22, having a waveform as shown in Fig. 5*c*, is applied to one grid of the gating tube 78 through a coupling capacitor 80. Proper bias is maintained on the word gate input by a bias resistor 82 connected to a suitable bias potential source as shown. A rectifier 84 acts to clamp the gating grid of the tube 78 to a maximum potential equal to the potential of the cathode of the tube 78.

With the gating tube 78 held open by the long word gate pulse, the timing pulses $S_a$ are coupled through the gating tube 78 to the cathodes of a pair of triodes 86 and 88. The control grid of the triode 88 is held at a fixed bias of −10 volts, for example, while the plate of the triode 88 is coupled to the multivibrator 58. The control grid of the triode 86 is connected through a clamping circuit to the binary number pulse output of the digital device 22. The clamping circuit on the control grid of the triode 86 includes a diode 90 connecting the grid to ground, and a diode 92 connecting the grid to a −20 volts, for example. The diode 90 normally holds the grid of the triode 86 at ground potential, but when a negative pulse is received, representing a digit one in the binary number received from the digital device 22, the grid of the triode 86 drops to the negative potential of −20 volts, where it is held by the diode 92. The diode 94 and voltage divider provided by the resistors 96 and 98 insure isolation of the grid circuit of the triode 86 from the binary number source, preventing any pulses from being coupled back to the digital device 22.

The triodes 86 and 88 act primarily as a switch, one or the other of them conducting depending upon whether a pulse or no-pulse is being received at the time from the digital device. A timing pulse gated by the tube 78, therefore, is either coupled to the multivibrator 58 or the multivibrator 60. Thus, it will be seen that with each of the timing pulses $S_a$, either the switch 12 or the switch 14 will be actuated depending upon whether a zero digit or a one digit is being received in the serial binary number from the digital device 22.

A second gating tube 100 is provided for coupling the timing pulses $S_c$ to the multivibrator 62 for actuating the switch 18. One grid of the gating tube 100 is also coupled to the word gate input in the same manner as the gating tube 78. The plate of the gating tube 100 is coupled by a triode 102 to the multivibrator 62, the triode 102 providing isolation between the pulse source and the multivibrator 62 to prevent transmission of pulses back towards the timing pulse source. Since the timing pulses $S_c$ are delayed behind the timing pulses $S_a$, as described above and particularly shown in Figs. 5*e* and *g*, as soon as one of the switches 12 or 14 is triggered by a timing pulse $S_a$, the switch 18 is triggered by timing pulse $S_c$. Thus, the sequence of operation described in connection with Fig. 1 is performed.

In order to provide for positive and negative numbers, the action of the switches 12 and 14 is reversed in response to the last digit of the binary number. For this purpose, timing pulse $S_b$ is utilized in place of the timing pulse $S_a$ at the time corresponding to the last digit of the binary number, which in the present case corresponds to the tenth clock pulse as particularly shown in Fig. 5. The pulse $S_b$ is coupled through a gating tube 104, which is operated in the same manner as the gating tube 78 and 100 in response to the word gate input. The output of the gating tube 104 at the plate thereof is coupled to the cathodes of a pair of triodes 106 and 108. The control grid of the triode 106 is connected to the same −10 volt potential source as the control grid of the triode 88. The plate of the triode 106 is connected to the multivibrator 60. The triode 108 in turn has its control grid coupled with the control grid of the triode 86 to the binary number input, while its plate is connected in parallel with the plate of the triode 88 to the input of the multivibrator 58. Thus, it will be seen that for the same digit input from the digital device, for example, the timing pulse $S_b$ will trigger the opposite switch, for example the switch 12, than would be triggered by one of the timing pulses $S_a$. In other words, by substituting a timing pulse $S_b$ for a timing pulse $S_a$ at the time the last digit is received in the binary number from the digital device, the sign of the number can be accounted for according to the concept of operation above described in connection with Figs. 3*a* and *b*.

As heretofore pointed out, the output voltage from the decoder is derived across the condenser 16. It is desirable that the output work into a very high impedance to reduce the leakage paths of the condensers 10 and 16. This is achieved by means of a cathode follower on the output including a triode 110, the control grid of which is connected to the condensers 10 and 16 and the cathode of which is coupled to ground through a constant current source including a triode 112. The cathode follower triode 110 is selected so as to have an extremely linear bias characteristic over the range of output potential across the condenser 10 of zero to E.

From the above description, it will be seen that the various objects of the invention have been achieved by the provision of an electronic circuit which is capable of converting binary digital numbers into an equivalent analogue voltage for both positive and negative numbers.

The circuit, because it is entirely electronic containing no relays or other mechanical or rotary devices, is capable of operation at extremely high pulse repetition rates, yet the accuracy of result does not depend on the accuracy of the repetition rate or in the duration of the number pulses or their amplitude.

However, although the circuit has been described as utilizing electronic switches, for example, it is to be understood that where slower pulse rates are used, mechanical relays can be utilized in place of the electronic switches. Also, although the circuit has been particularly described for use with both positive and negative binary numbers, it will be understood that only positive numbers may be decoded. In this case only the timing pulses $S_a$ and $S_c$ are utilized and both groups of pulses are equal in number to the number of digits in the binary number being decoded. Thus, the gating tube 104 and the triodes 106 and 108 would not be used.

Furthermore, although the switch 18 has been shown as being inserted between the condenser 16 and ground, it will be understood that since the purpose of the switch 18 is to connect the two condensers 10 and 16 in parallel, the switch could also be connected between them on the high potential side rather than on the ground side as shown in the preferred embodiment described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for converting to an analog voltage a binary number represented by a series of pulses and no-pulses indicative of the binary digits one and zero respectively, said apparatus comprising first and second condensers, means including a first diode switch for connecting the condensers in parallel, means including a second diode switch for connecting one of said condensers across a potential source, means including a third diode switch for connecting a short-circuit across said one condenser, said analog output voltage being derived across one of said condensers, three monostable multivibrators coupled respectively to each of said switches for momentarily closing the associated switches when triggered, a source of clock pulses, said binary number pulses being in synchronism with said clock pulses, means for generating a first series of timing pulses from said clock pulse source, the timing pulses having the same period but delayed a fraction of a period behind the clock pulses, the first series of timing pulses being one less than the number of digits in the binary number being decoded, means for generating a single timing pulse from a clock pulse, the single timing pulse being triggered out one period after the last pulse of said first series of timing pulses, means for generating a second series of timing pulses from the clock pulses, the second series starting simultaneously with the first series of timing pulses, the timing pulses of the second series being delayed a fraction of period behind the timing pulses of the first series and being equal in number to the number of digits in the binary number, first electronic switching means gated by the binary number pulses for normally coupling the pulses of said first series to the multivibrator associated with said third diode switch, said first switching means when gated by a binary number pulse coupling the next successive timing pulse to the multivibrator associated with the second diode switch, second electronic switching means gated by the binary number pulses for normally coupling said single binary pulse to the multivibrator associated with the second diode switch, said second switching means when gated by a binary number pulse coupling said single timing pulse to the multivibrator associated with said third diode switch, and means for coupling said second series of timing pulses to the multivibrator associated with said first diode switch for actuating said first switching means.

2. Apparatus for converting to an analog voltage a binary number represented by a series of pulses and no-pulses indicative of the binary digits one and zero respectively, said apparatus comprising first and second condensers, means including a first diode switch for connecting the condensers in parallel, means including a second diode switch for connecting one of said condensers across a potential source, means including a third diode switch for connecting a short-circuit across said one condenser, said analog output voltage being derived across one of said condensers, three monostable multivibrators coupled respectively to each of said switches for momentarily closing the associated switches when triggered, a source of clock pulses, said binary number pulses being in synchronism with said clock pulses, means for generating a first series of timing pulses from said clock pulse source, the timing pulses having the same period but delayed a fraction of a period behind the clock pulses, means for generating a second series of timing pulses from the clock pulses, the second series starting simultaneously with the first series of timing pulses, the timing pulses of the second series being delayed a fraction of period behind the timing pulses of the first series and being equal in number to the number of digits in the binary number, first electronic switching means gated by the binary number pulses for normally coupling the pulses of said first series to the multivibrator associated with said third diode switch, said first switching means when gated by a binary number pulse coupling the next successive timing pulse to the multivibrator associated with the second diode switch, and means for coupling said second series of timing pulses to the multivibrator associated with said first diode switch for actuating said first switching means.

3. Apparatus for converting to an analog voltage a binary number represented by a series of pulses and no-pulses indicative of the binary digits one and zero respectively, said apparatus comprising first and second condensers, means including a first diode switch for connecting the condensers in parallel, means including a second diode switch for connecting one of said condensers across a potential source, means including a third diode switch for connecting a short-circuit across said one condenser, said analog output voltage being derived across one of said condensers, a source of clock pulses, said binary number pulses being in synchronism with said clock pulses, means for generating a first series of timing pulses from said clock pulse source, the timing pulses having the same period but delayed a fraction of a period behind the clock pulses, means for generating a second series of timing pulses from the clock pulses, the second series starting simultaneously with the first series of timing pulses, the timing pulses of the second series being delayed a fraction of period behind the timing pulses of the first series and being equal in number to the number of digits in the binary number, means including an electronic switch gated by the binary number pulses and coupled to said means for generating the first series of timing pulses, said means being coupled to the second and third diode switching means, whereby the timing pulses actuate one or the other of the diode switching means in response to the binary number pulses, and means for coupling said second series of timing pulses to the first diode switching means for actuating said first switching means.

4. Apparatus for converting to an analog voltage a binary number represented by a series of pulses and no-pulses indicative of the binary digits one and zero respectively, said apparatus comprising first and second condensers, switching means for connecting the condensers in parallel, switching means for connecting one of said condensers across a potential source, switching means for connecting a short-circuit across said one condenser, said analog output voltage being derived across one of said condensers, a source of clock pulses, said binary number pulses being in synchronism with said clock pulses, means for generating a first series of timing pulses from said clock pulse source, the timing pulses having the same period but delayed a fraction of a period behind the clock pulses, means for generating a second series of timing pulses from the clock pulses, the second series starting simultaneously with the first series of timing pulses, the timing pulses of the second series being delayed a fraction of period behind the timing pulses of the first series and being equal in number to the number of digits in the binary number, means including an electronic switch gated by the binary number pulses and coupled to said means for generating the first series of timing pulses, said means being coupled to the second and third switching means, whereby the timing pulses actuate one or the other of the switching means in response to the binary number pulses, and means for coupling said second series of timing pulses to the first switching means for actuating said first switching means.

5. Apparatus for converting to an analog voltage a binary number represented by a series of pulses and no-pulses indicative of the binary digits one and zero respectively, said apparatus comprising first and second condensers, switching means for connecting the condensers in parallel, switching means for connecting one of said condensers across a potential source, switching means for connecting a short-circuit across said one condenser, said analog output voltage being derived across one of said condensers, means for generating a first series of timing pulses, means for generating a second series of timing pulses, the second series starting simultaneously with the first series of timing pulses, the timing pulses of the second series being delayed a fraction of period behind the timing pulses of the first series and being equal in number to the number of digits in the binary number, means including an electronic switch gated by the binary number pulses and coupled to said means for generating the first series of timing pulses, said means being coupled to the second and third switching means, whereby the timing pulses actuate one or the other of the switching means in response to the binary number pulses, and means for coupling said second series of timing pulses to the first switching means for actuating said first switching means.

6. Apparatus for converting to an analog voltage a serial binary number in the form of pulses for the one digit and no-pulses for the zero digits with the least significant digit occurring first, said apparatus comprising a first condenser, means for charging the first condenser to a fixed potential in response to a one digit pulse, means for discharging the first condenser in response to a zero digit no-pulse, a second condenser equal in capacity to the first condenser, and means for connecting the second condenser in parallel with the first condenser to equalize the accumulated charge between the two condensers, said last-named means including means for disconnecting the two condensers during the time a binary digit is received, whereby the condensers are only connected in parallel in the time intervals between the pulses and no-pulses comprising the serial binary number.

7. The method of converting to an analog voltage a serial binary number in the form of pulses for the one digits and no-pulses for the zero digits with the least significant digit occurring first, said method comprising the steps of charging a first condenser to a fixed potential in response to the one digit pulses except for the last digit, discharging the condenser in response to the zero digit no-pulses except for the last digit, charging the first condenser to a fixed potential in response to a zero digit no-pulse for the last digit of the serial binary number, discharging the condenser in response to a one digit pulse for the last digit of the serial binary number, and connecting the first condenser in parallel with a second condenser momentarily following the charging or discharging of the first condenser by reception of a binary digit.

8. The method of converting to an analog voltage a serial binary number in the form of pulses for the one digits and no-pulses for the zero digits with the least significant digit occurring first, said method comprising the steps of charging a first condenser to a fixed potential in response to the one digit pulses, discharging the condenser in response to the zero digit no-pulses, and connecting the first condenser in parallel with a second condenser momentarily following the charging or discharging of the first condenser by reception of a binary digit.

9. The method of converting to an analog voltage a serial binary number consisting of zero and one digits in identifiable pulse form, said method comprising the steps of charging a first condenser to a fixed potential in response to the one digit pulse forms, discharging the first condenser in response to the zero digit pulse forms, and connecting the first condenser in parallel with a second condenser momentarily following the charging or discharging of the first condenser by reception of a binary digit.

No references cited.